(12) United States Patent
Yoshida

(10) Patent No.: US 11,654,604 B2
(45) Date of Patent: May 23, 2023

(54) REMOTE DIAGNOSTIC SYSTEM

(71) Applicant: KOSMEK LTD., Kobe (JP)

(72) Inventor: Masakazu Yoshida, Kobe (JP)

(73) Assignee: KOSMEK LTD.

( * ) Notice: Subject to any disclaimer, the term of this patent is extended or adjusted under 35 U.S.C. 154(b) by 155 days.

(21) Appl. No.: 16/976,594

(22) PCT Filed: Apr. 22, 2019

(86) PCT No.: PCT/JP2019/016924
§ 371 (c)(1),
(2) Date: Aug. 28, 2020

(87) PCT Pub. No.: WO2019/208464
PCT Pub. Date: Oct. 31, 2019

(65) Prior Publication Data
US 2021/0362389 A1    Nov. 25, 2021

(30) Foreign Application Priority Data

Apr. 27, 2018   (JP) .............................. JP2018-086352
Oct. 30, 2018   (JP) .............................. JP2018-203600

(51) Int. Cl.
*B29C 45/80* (2006.01)
*B29C 45/76* (2006.01)

(52) U.S. Cl.
CPC .......... *B29C 45/80* (2013.01); *B29C 45/7653* (2013.01); *B29C 2945/76006* (2013.01);
(Continued)

(58) Field of Classification Search
CPC ................ B29C 45/80; B29C 45/7653; B29C 2945/76006; B29C 2945/76083;
(Continued)

(56) References Cited

U.S. PATENT DOCUMENTS

2002/0031567 A1 *  3/2002  Magario ................. B29C 45/76
                                                               425/135
2003/0111772 A1 *  6/2003  Yim ..................... B29C 45/7337
                                                               264/327

FOREIGN PATENT DOCUMENTS

EP       3546180 A1 * 10/2019 ............. B29C 45/76
JP       H 6-725 U      1/1994
(Continued)

OTHER PUBLICATIONS

International Search Report dated Jul. 16, 2019 issued in International Application No. PCT/JP2019/016924 (1 page).

*Primary Examiner* — S. Behrooz Ghorishi
(74) *Attorney, Agent, or Firm* — Merek, Blackmon & Voorhees, LLC

(57) ABSTRACT

In the present invention, constructed is a highly reliable system that does not allow unforeseen conditions to occur in the remote diagnosis of a clamp device. All combinations of status of a state detection switch mounted on a clamp device are anticipated in advance by a recursive method, and the states are defined with no omissions. A control unit 9 includes: a main body memory 9c that stores the ON/OFF state of a state switch together with the status of an injection molding machine main body, the clamp status and time information; and a main body communication unit 9d which is capable of short-range wireless communication. A message diagnosing a failure is stored in a smartphone 12 for all combinations of the ON/OFF state of the state detection switch for each of the following cases: whether in mold replacement mode or not; and whether a clamp device is in a clamped state or an unclamped state, or in a state other than the forgoing. The history of the ON/OFF state of the state detection switch with respect to the status of the main body and the clamp status is read from the main body memory 9c

(Continued)

by wireless communication, and a corresponding message is displayed.

1 Claim, 9 Drawing Sheets

(52) U.S. Cl.
CPC ............. *B29C 2945/7623* (2013.01); *B29C 2945/76083* (2013.01); *B29C 2945/76387* (2013.01); *B29C 2945/76394* (2013.01); *B29C 2945/76568* (2013.01); *B29C 2945/76702* (2013.01); *B29C 2945/76709* (2013.01)

(58) Field of Classification Search
CPC .. B29C 2945/7623; B29C 2945/76387; B29C 2945/76394; B29C 2945/76568; B29C 2945/76702; B29C 2945/76709; B29C 33/305; B29C 2045/1746; B29C 2045/7606; B29C 2945/76033; B29C 2945/76167; B29C 2945/76227; B29C 2945/76939; B29C 2945/76993; B29C 45/1742; B29C 45/1743; B29C 45/76; B29C 45/84; B29C 45/1756; H04Q 9/00; G05B 2219/14084; G05B 2219/33284; G05B 2219/24048

See application file for complete search history.

(56) References Cited

FOREIGN PATENT DOCUMENTS

| JP | 2003001688 | 1/2003 |
| JP | 2005079612 | 3/2005 |
| JP | 2005515080 | 5/2005 |
| JP | 2006110765 | 4/2006 |
| JP | 2009119616 | 6/2009 |

* cited by examiner

FIG. 1 A
FIG. 1B
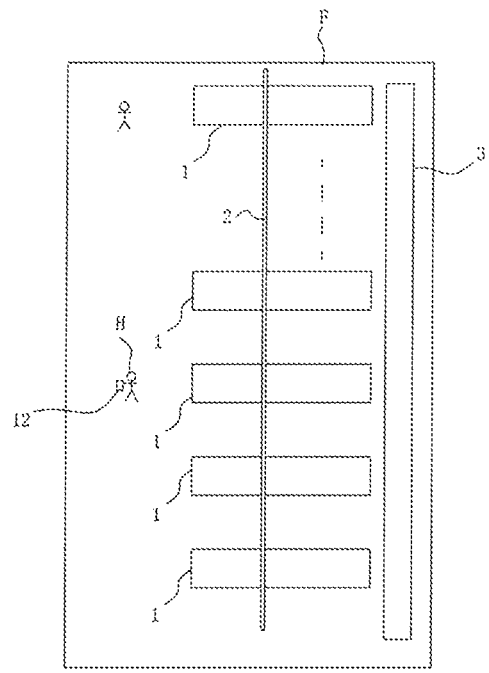
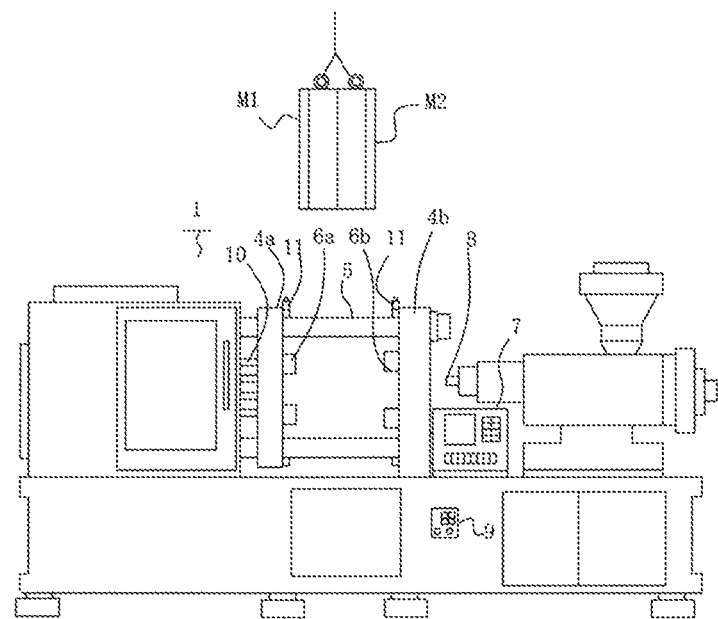

REMOTE DIAGNOSTIC SYSTEM

FIELD OF THE INVENTION

The present invention relates to a remote diagnostic system for grasping a mold replacing state in a clamp device without omission in a mold handling device.

A remote monitoring system capable of remotely monitoring a mold handling device such as an injection molding machine, a press machine, a die casting device, etc., is described for example in patent literatures 1, 2.

The patent literature 1 describes that in a display device of a management system for managing a plurality of injection molding machines, at least one kind of screen of a plurality of types of screens displayed in order to express the management status of each injection molding machine is taken into a communication terminal device through a communication network and displayed on an attached display device to monitor the operation status of each injection molding machine. One of the plurality of types of screens is an operation status screen for collectively displaying the operation status of each injection molding machine on at least one screen in real time on all the machines in a screen division format. The communication terminal device can display the operation status screen, and can display a screen showing details of the operation status of only the corresponding machine by clicking on a specific place of each machine that is divided and displayed.

In patent literature 2, injection molding machines in a production plant are respectively provided with control devices for converting operation status data such as numerical data of these injection molding machines into image data, when an operation request is made from a personal computer of an office existing in a remote place to the injection molding machines, the control devices convert the operation status data into image data and transmit the image data to the personal computer. Security safety can be improved by transmitting the data after converting into image data which cannot be easily rewritten.

On the other hand, in patent literature 3, a system that connects a detection terminal for detecting gradient brain wave of head of a driver and an on-vehicle smartphone by Bluetooth (R) communication to notify from the smartphone to a remote monitoring terminal is known. This technique uses a Bluetooth function of the smartphone and a communication function with remote telephones to acquire information from the detection terminal stored in the smartphone on the monitoring terminal side.

PRIOR ART

Patent Literature

Patent literature 1: Japanese Patent Laid Open Publication No. 2003-1688
Patent literature 2: Japanese Patent Laid Open Publication No. 2006-110765
Patent literature 3: Japanese Patent Laid Open Publication No. 2005-79612

DISCLOSURE OF THE INVENTION

Problems to be Solved by the Invention

In a mold handling device, a user who uses the mold handling device can arbitrarily select a mold clamp system for fixing a mold. Since there are many different types of clamp devices required by users, maker sides for manufacturing main bodies of mold handling devices cannot support product lineup in which the mold clamp system that meets the user's request is set as a set product in advance. Also, even after the mold handling device is installed in the factory, mechanism of the clamp device is frequently changed. Accordingly, the maker's works are divided into makers for manufacturing the main bodies of the mold handling devices and makers for manufacturing the mold clamp systems. It is often up to the production site to determine what type of clamp device to use.

In the techniques disclosed in patent literatures 1, 2, production plants are established in remote places such as overseas, and a plurality of machine tools and the like provided in the production plants are managed by each head office through communication lines. In this case, although the head office can manage the main body of the injection molding machine, it is difficult to grasp the diversity of local mold clamp systems at the head office.

Also, in the technique disclosed in patent literature 3, a smartphone is mounted on the vehicle, and the Bluetooth communication can be performed in a state in which the Bluetooth is close to the driver's detection terminal and the pairing of both is maintained. If a person's head is tilted to generate θ wave, the person is determined to be a doze. Based on this phenomenon, the detection terminal side makes a priori diagnosis that the target driver is dozing if the driver's head tilts and the θ wave is generated. In this case, if any other phenomena occur, it will be unexpected and the detection terminal side cannot cope with them. In the mold clamp system, unexpected things can happen because the types of clamping mechanisms mounted on the injection molding machines vary depending on the users.

The present invention has been made to solve such a problem, the object of the present invention is to construct a highly reliable system which does not cause unexpected conditions for the mold handling device installed in the production site, by previously assuming all combinations for the clamping mechanism which is installed at the user's option and may be changed thereafter in a recursive manner and then by fully defining states.

Means to Solve the Problem

The remote diagnostic system of the present invention refers to a remote diagnostic system of a mold handling device provided to a platen with a clamp for mounting at least two kinds of state detection switches among a state detection switch for detecting an advance position that detects whether approaching to the mold, a state detection switch for detecting a retreat position that detects whether separating from the mold to a limit position, a state detection switch for detecting that an output member of the clamp device has locked the mold, a state detection switch that detects whether or not the output member has released the mold, a state detection switch that detects whether or not a hydraulic pressure for locking a clamp rod exceeds a threshold value, and a state detection switch that detects whether or not the hydraulic pressure for releasing the clamp rod exceeds a threshold value. Here, the remote diagnostic system of the present invention includes a control unit and a smartphone, and further, the control unit has a main body side memory and a main body side communication unit, and the smartphone has a terminal side memory, a terminal side communication unit and a display unit. The main body side memory stores an ON/OFF state of the state detection switch mounted on the clamp device together with information as to whether or not the mold handling device main body is in a mold replacement mode (a main body status), information as to whether the clamp device is in a clamped state or an unclamped state or other states (a clamp status), and time information. The main body side communication unit is capable of short range wireless communication or wired communication. The terminal side memory stores a message for diagnosing a failure for all the combinations in the ON/OFF states of the state detection switch mounted on the clamp device to determine whether or not the mold handling device main body is in a mold replacement mode, whether the clamp device is in the clamped state or the unclamped state, and other states. The terminal side communication unit reads out a history of ON/OFF states of the state switch for the main body status and the clamp status from the main body side memory by the wireless communication or the wired communication. The display unit acquires and displays a message corresponding to the read history from the terminal side memory.

Effects of Invention

According to the present invention, all combinations are previously assumed for all combinations of the outputs of the state detection switch, the state of the mold handling device main body, and the clamp status in the recursive method, and diagnostic states of the clamp device are fully defined as the contents of the message for the combinations of them, and therefore, a work manager can refer to the contents of the message which can construct a highly reliable system by eliminating unexpected conditions, thereby being capable of accelerating on-site response.

BRIEF DESCRIPTION OF THE DRAWINGS

FIGS. 1A and 1B show an object to which a remote diagnostic system is applied. FIG. 1A shows a production site where an injection molding machine is installed, and FIG. 1B shows the injection molding machine.

FIGS. 7A, 7B are front views of magnet clamps on a movable platen side and a fixed platen side, respectively. FIG. 7C is an electric circuit, FIG. 7D is a power source for driving a magnetizing coil, and FIG. 7E is a diagram showing a display of the smartphone.

PREFERRED EMBODIMENT OF THE INVENTION

Figure 2:
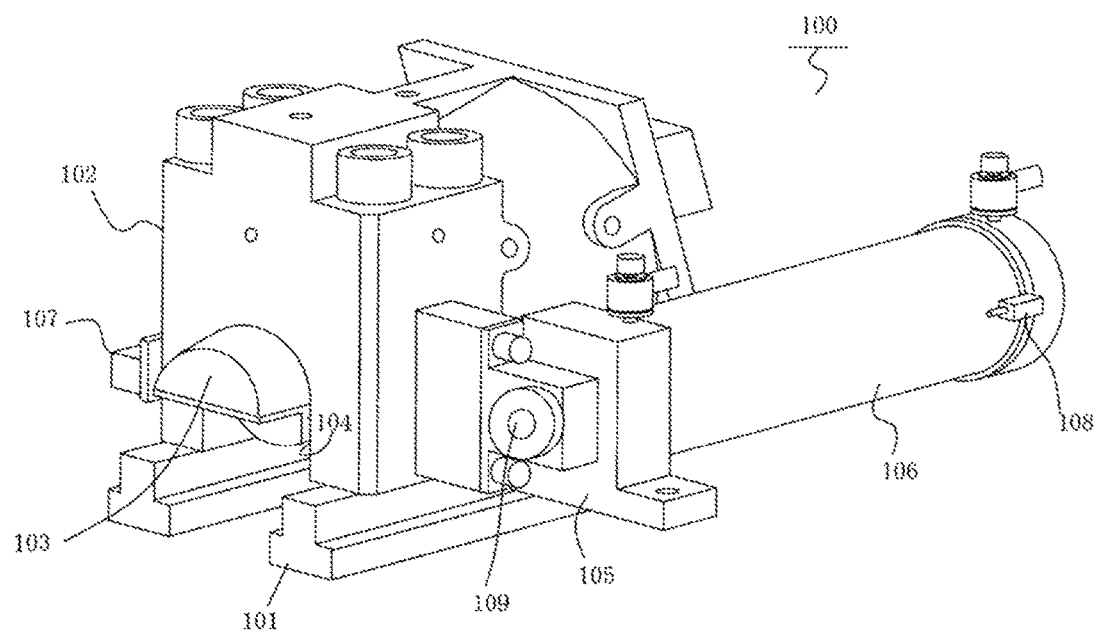
FIG. 2 is a perspective view of a T-slot automatic slide type clamp device having a mechanical lock mechanism.

FIG. 1A shows a typical production site F in which an injection molding machine is installed as an example of a mold handling device and an injection molding machine 1. In FIG. 1A, a plurality of injection molding machines 1 are installed in a row in a plant. A movable crane 2 is installed on a ceiling so as to extend over the injection molding machine 1, and transports a mold towards the injection molding machine 1. A belt conveyor 3 for conveying a material is provided on the right side in the figure.

The injection molding machine 1 in FIG. 1B includes left and right platens 4a, 4b, to which molds M1, M2 are respectively attached, and a guide rod 5, which guides and supports the left side platen 4a so that it moves forward and backward in the left and right direction. Hereinafter, the moving side may be referred to as a movable platen 4a and the fixed side may be referred to as a fixed platen 4b in embodiments. The platens 4a, 4b are mounted with clamp devices 6a, 6b that clamp the molds M1, M2, respectively. A controller 7 with a liquid crystal display screen is what the injection molding machine 1 originally possess. A control unit 9 is an option provided by manufacturers of mold clamp systems, which controls the clamp devices 6a, 6b and stores signals detected by a number of state detection switches provided to the clamp devices 6a, 6b and then determines normal/abnormal. The control unit 9 exchanges the signals with the controller 7, and for example, receives information of "mold replacement mode" indicating that the operation mode of the injection molding machine 1 is selected in a state in which the mold replacement is performed from the controller 7. In addition, the control unit 9 sends the controller 7 information of "mold replacement-ON" indicating that the clamp system is replacing the mold and information indicating abnormality of the clamp device, and the like.

Reference numeral 8 denotes a nozzle that injects resin, and reference numeral 10 denotes an ejector rod that extrudes an injection-molded product from the mold M1. Further, reference numeral 11 is a mold auxiliary metal fitting that fixes a wire for suspending the molds M1, M2.

There are various kinds of mechanisms of the clamp devices 6a, 6b, and there are types including a T-slot manual type, a T-slot automatic slide type, an in-block manual slide type, an in-block automatic slide type, a block fixing type, and a type with mechanical lock mechanism. These can be further classified into hydraulic type and pneumatic type. Moreover, there are also magnet clamps that hold the molds M1, M2 by using magnetic force.

Among these, the T-slot manual type and the T-slot automatic slide type slid in T-lots that are provided in the platens 4a, 4b to come close to the molds M1, M2, and differ in whether the power sliding in T-slots is manual or pneumatic pressure. There are some clamp devices whose base parts are fitted to mounting screw holes of the platens by bolts in the in-block manual slide type, the in-block automatic slide type and the block fixing type. They also differ in whether the power sliding on each base part is manual or pneumatic pressure. The block fixing type is to be fixed to the mounting screw holes of the platens not to move. The mechanical lock mechanism is to mechanically exert a sufficient holding force even if the lock hydraulic pressure is lost due to breakage of pipes or the like.

Work managers H are arranged for a plurality of injection molding machines 1. The work managers H can communicate with the control unit 9 provided in each injection molding machine 1 by possessed smartphones 12 (terminal devices such as a cellular phone, a radio portable terminal and the like). In all of the injection molding machines 1, there is a possibility that the same type of clamp devices are mounted or different type of clamp devices depending on the introduction year or the use are mounted. A remote diagnostic program 25 (FIG. 5) is installed in each smartphone 12, and a unique diagnostic result can be found even if any type of clamp devices are installed. This will be described later.

An example in which a T-slot automatic slide type clamp device 100 having a mechanical lock mechanism shown in FIG. 2 is mounted as the clamp devices 6a, 6b will be explained.

In the figure, the clamp device 100 has a T-leg 101 which slides along the T-slot of the platen 4a (or 4b) on the bottom surface of a housing 102. A clamp rod 103 moves back and forth obliquely downward from a guide hole 104 of the housing 102 to press and fix the mold M1 (or M2) disposed on the platen 4a (or 4b). A pneumatic cylinder 106 is provided on the side of the housing 102 to be fixed on the platen 4a (or 4b) through a base 105.

A forward limit switch (forward limit LS) 107 mounted on the housing 102 is a state detection switch for detecting an advance position that detects whether the housing is close to a mold, and a proximity switch is used as the forward limit switch. The forward limit switch 107 is turned in an ON state when the housing 102 reaches a lock position for clamping the mold M1 (or M2), and in an OFF state when the housing 102 is separated. An automatic switch is used as a rearward limit switch (rearward limit LS) 108 mounted on the rear end of the pneumatic cylinder 106. The rearward limit switch 108 is to detect whether the housing is separated from the mold to the limit position, and detects movement of an output member (including a piston and a piston rod) 109 in the pneumatic cylinder. When the housing 102 reaches the limit position separated from the mold M1 (or M2), the rearward switch is turned in an ON state, and when the housing 102 approaches from the limit position to the mold, the rearward switch is turned in an OFF state.

FIG. 3 is a figure further illustrating the clamp device 100. FIGS. 3A, 3B show a status that the output member 109 of the pneumatic cylinder 106 causes the housing 102 to move back and forth along the T-slot 41. FIGS. 3C, 3D are cross-sectional views of the housing 102. FIG. 3C shows a status that the mold M1 (or M2) is locked while clamping, and FIG. 3D shows a status that it is released while unclamping.

Figure 3A:
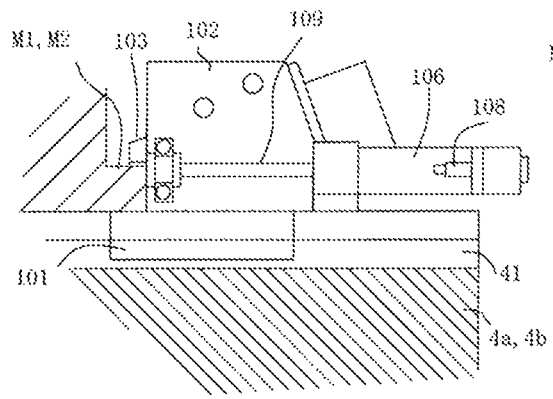
FIGS. 3A, 3B, 3C and 3D each of which explaining a clamp device, and each of FIGS. 3A, 3B shows a way in which a piston of a pneumatic cylinder causes a housing to move back and forth, and each of FIGS. 3C, 3D shows a cross section of the housing.
Figure 3B:
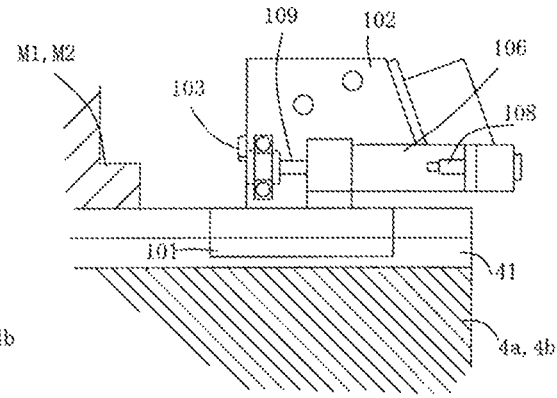
Figure 3C:
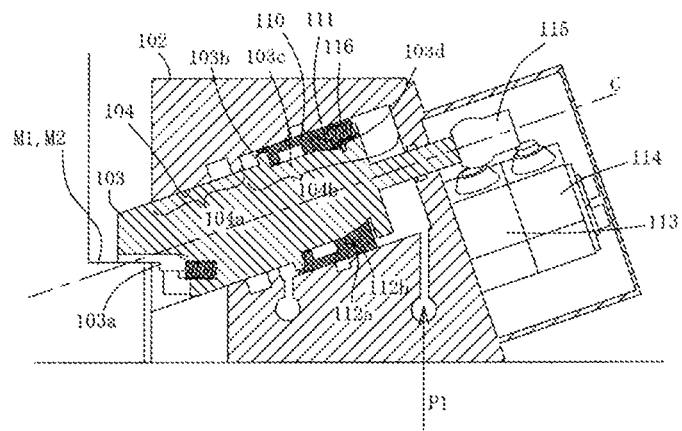
Figure 3D:
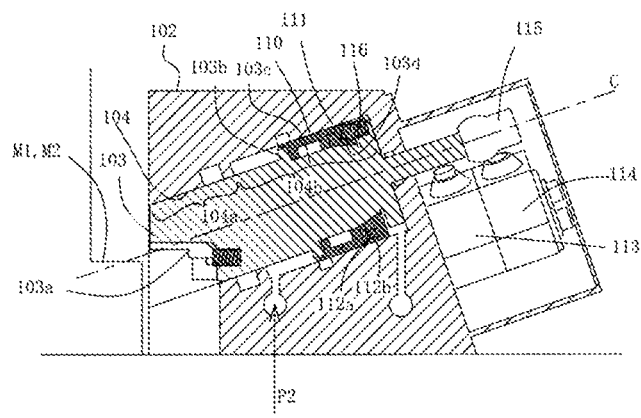

In FIGS. 3C, 3D, the guide hole 104 is formed to be inclined in the lower left direction in each figure. While clamping, the left end (left lead end portion) of the clamp rod 103 presses and locks the mold M1 (or M2). The clamp rod 103 is provided with a clamping member 103a provided on a part close to the left end (a part close to the left lead end portion) in the axial direction thereof, a flange 103b and an inner piston 103c provided on a part close to a right end (a part close to a base end), and a tapered pressure receiving surface 103d provided on the right side of the figure of the inner piston 103c. The pressure receiving surface 103d is formed so that it approaches the axis center C as it moves toward the right end (base end direction).

The guide hole 104 is provided with a small-diameter hole 104a and a large-diameter hole 104b that are formed in this order from the left side of the figure. In the large-diameter hole 104b, an outer piston 110 is externally inserted to the outer peripheral surface of the inner piston 103c. Further, on the right side of the figure of the outer piston 110, a collet 111 having an inner peripheral surface along the tapered shape of the pressure receiving surface 103d is externally inserted on the inner piston 103c. The collet 111 is composed of four divided members arranged at substantially equal intervals in the circumferential direction. The collet 111 is divided so that when the collet 111 moves to the left along the tapered surface of the pressure receiving surface 103d, the collet 111 can expand radially outward with respect to the axis center C. The collet 111 and the outer piston 110 have hook parts 112a, 112b so that the collet 111 and the outer piston 110 can move together in the direction of the axis center C of the guide hole 104. The mechanical lock mechanism of the clamp device 100 means a wedge engagement due to the collet 111, but this will be referred when explaining the operation.

An operating member 115 that operates a lock switch (a lock limit switch, hereinafter referred to as a lock LS) 113 and a release switch (a release limit switch, hereinafter referred to as a release LS) 114 is mounted on the rear side (right side in the figure) of the clamp rod 103. The lock LS 113 is a state detection switch that is turned in an ON state while clamping and that is turned in an OFF state while unclamping. The release LS 114 is a state detection switch that is turned in an ON state while unclamping and is turned in an OFF state at times other than while unclamping.

The clamp device 100 operates as follows.

When transitioning from unclamping to clamping in FIG. 3C, pressure oil is discharged from a release chamber on the front side (left side in FIG. 3C) of the outer piston, and pressure oil is supplied to a lock chamber on the rear side (right side in FIG. 3C) of the inner piston 113c (FIG. 3C, an arrow P1). The clamp rod 103 has the mold M1 (or M2) clamped on the platen 4a (or 4b) by the hydraulic force in the lock chamber. On the other hand, the outer piston 110 has the collet 111 wedge-engaged with the pressure receiving surface 103d to strongly press the clamp rod 103 to the guide hole 104.

When transitioning from clamping to unclamping, pressure oil in the lock chamber is discharged, and pressure oil is supplied to the release chamber (FIG. 3D, an arrow P2). Thus, the outer piston 110 is retreated to the upper right side along the guide hole 104 by the hydraulic force. According to this, first of all, the outer piston 110 presses the collet 111 to the upper right side to release the wedge engagement of the collet 111. Subsequently, the clamp rod 103 is retreated to the upper right side through a spring 116 on the rear side of the collet 111. Thereby, the mold M1 (or M2) related to the clamp rod 103 is released.

Figure 4:
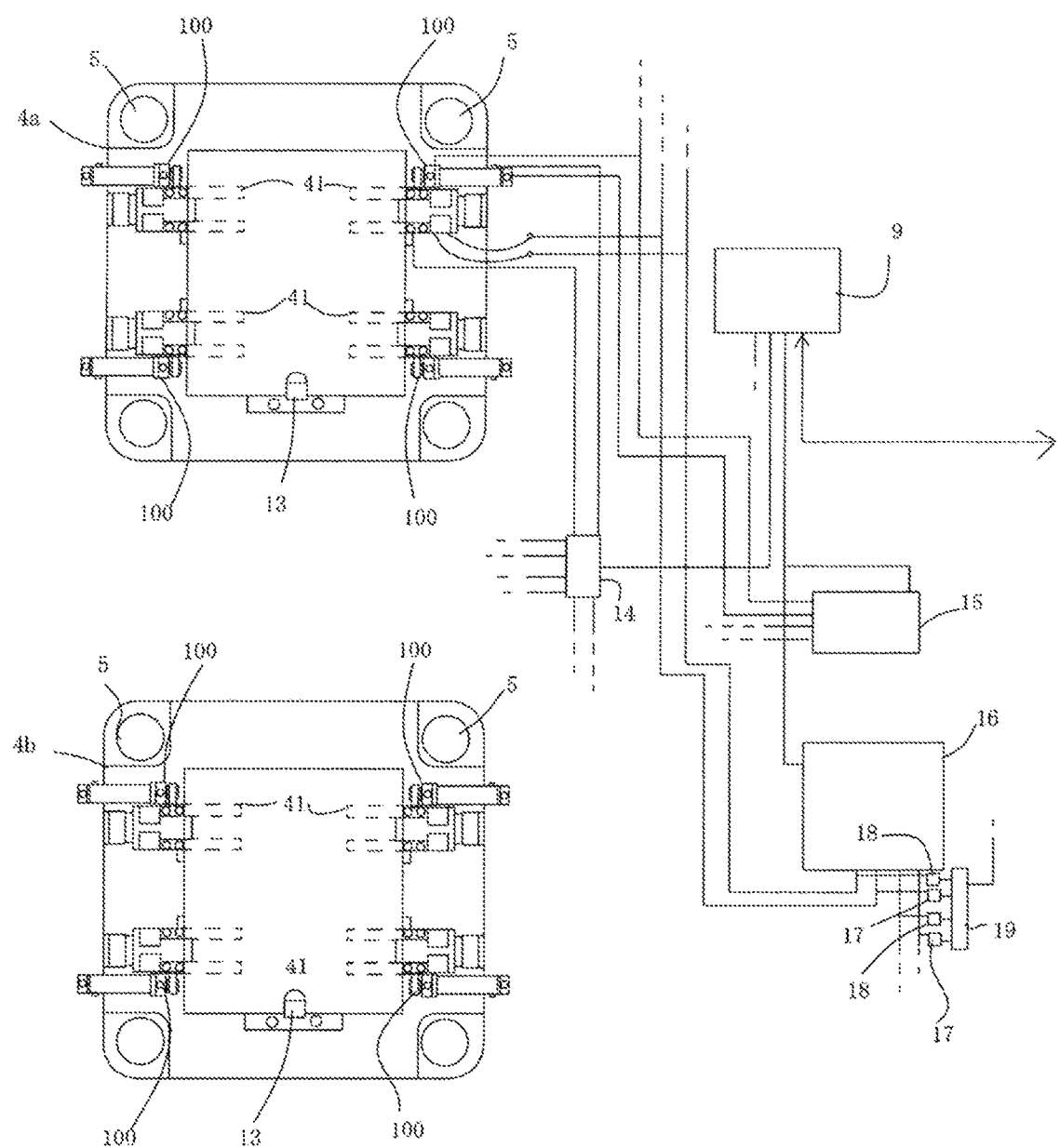
FIG. 4 is a figure showing a connection between the clamp device and the control unit.

FIG. 4 shows a connection between the clamp device 100 and the control unit 9. The movable side platen 4a and the fixed side platen 4b are provided with four clamp devices 100, which are installed in respective T-slots 41, respectively. The clamp device 100 is supplied with compressed air from an air valve unit 15 and with pressure oil from a hydraulic unit 16. An electric signal from the clamp device 100 is connected to the control unit 9. This electric wiring connects the front limit switch 107, the rear limit switch 108, the lock LS 113 and the release LS 114. In the figure, the connection of only one clamp device 100 and the control unit 9 and the like is shown, but the other clamp devices 100 are similarly connected. The hydraulic unit 16 is provided with two systems of a lock side system for feeding pressure oil while clamping and a release side system for feeding pressure oil while unclamping, and a pressure switch is provided to each of them. A pressure switch for detecting the pressure of the lock side system is referred to as a lock pressure switch (a lock PS 17), and a pressure switch for detecting the pressure of the release side system is referred to as a release pressure switch (a release PS 18). Each pressure switch is turned in an ON state when the pressure is increased, and in an OFF state when the pressure is lowered. These switches are also state detection switches.

Numeral reference 13 is a mold support block, and numeral references 14, 19 are electric connectors, respectively.

Figure 5:
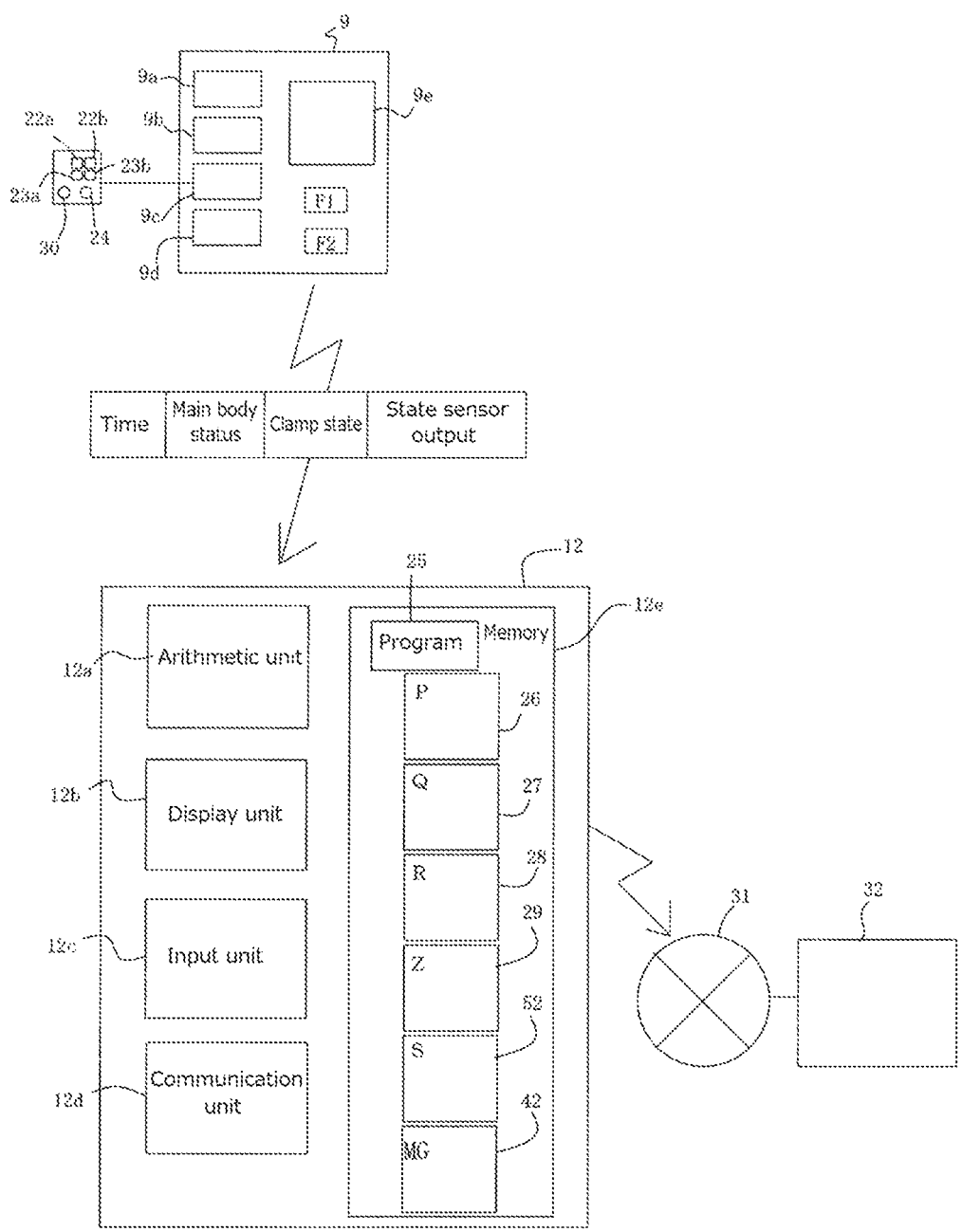
FIG. 5 is a figure showing a configuration of a remote diagnostic system.

FIG. 5 shows a configuration of a remote diagnostic system. The control unit 9 attached to the injection molding machine 1 includes an arithmetic unit 9a, a display unit 9b, an input unit 9c, a main body communication unit 9d, and a main body memory 9e. The control unit 9 is determined depending on the type of the clamp device attached to the injection molding machine 1, and stores the state of the main body from the power-on of the injection molding machine 1, the state of clamping, the ON/OFF state of each state detection switch when the state of state detection switch changes, and the time in the main body memory 9e. The main body communication unit 9d can read out the state of the main body, the state of clamping, the ON/OFF state of the state detection switch and the time from the main body memory 9e through a short-range wireless communication (for example, a Bluetooth communication) and transmit to the outside. The control unit 9 includes lock buttons 22a, 22b for starting clamping operation to each of the clamp devices of the movable platen 4a and the fixed platen 4b, release buttons 23a, 23b and a reset button 24 for starting the unclamping operation to each of the movable platen 4a and the fixed platen 4b, and a mold replacement key 30 or the like which the operator switches operation to a molding machine operable mode and a mold replaceable mode.

A smartphone 12 possessed by the work manager includes an arithmetic unit 12a, a display unit 12b, an input unit 12c, a portable communication unit (terminal communication unit) 12d, and a portable communication part (terminal memory) 12e, which is a portable telephone terminal capable of performing mail communication at a long distance through a network. The portable communication unit 12d has a short-range wireless function. A remote diagnostic program 25 provided by the manufacturer for manufacturing the mold clamp system is downloaded to the portable (terminal) memory 12e. With the remote diagnostic program 25, messages for defining states to be assumed are stored in each table for all combinations that can be taken by each state detection switch. Tables such as a P-table 26, a Q-table 27, an R-table 28, a Z-table 29, and an S-table 52 are stored. The P-table 26 stores messages for a T-slot automatic slide type clamp device having a mechanical lock mechanism. The Q-table 27, the R-table 28, the Z-table 29 and the S-table 52 stores messages for a T-slot manual type, a T-slot automatic slide type, a block fixed type clamp device and a magnet clamp 200, respectively.

Depending on whether or not the injection molding machine 1 is in the mold replacement mode, or depending on the clamp status by the control unit 9, even if the detection switches are the same, the states thereof have different meanings. The P-table 26, the Q-table 27, the R-table 28, and the Z-table 29 are prepared according to matching whether or not the injection molding machine 1 is in a mold replacement mode, and the combinations of the clamp statuses due to the control unit 9 with the ON/OFF combinations of these state detection switches. Whether or not the injection molding machine 1 is a mold replacement mode is hereinafter referred to as a "status of main body". The "status of main body" can be defined according to a mold replacement key 30 that is switched by the operator. The clamp status is referred to as a "clamped state" of a process in which the clamp device 100 transits from unclamping to clamping, an "unclamped state" of a process in which the clamp device 100 transits from clamping to unclamping, or a state other than the foregoing.

For example, the state detection switch is described below, in case of a T-slot automatic slide type having a mechanical lock mechanism, the front limit switch 107, the rear limit switch 108, the release LS114, the lock LS113, the lock PS17 and the release PS18 are provided as the state detection switches for knowing the state of the clamp device 100, and the number of combinations of the ON/OFF states of the state detection switches is the largest in 16 ways. Thus, the amount of messages stored in the P-table 26 is largest.

On the other hand, since the block fixing type clamp device does not have an automatic slider function and its position does not change, it is not provided with the front limit switch 107 and the rear limit switch 108 and releases by an internal spring not pressure oil. Therefore, only the release LS114 and the lock LS113 are provided as a state detection switch. Thus, the number of the combinations of the ON/OFF states of the state detection switches is minimized in four ways. Thus, the amount of messages stored in the Z-table 29 is minimized.

The T-slot manual slide type having no mechanical lock mechanism has the front limit switch 107 and the lock PS17. Therefore, since there are two types of the state detection switches like the block fixed type, the Z-table 29 is applied. The automatic T-slot slide type has the front limit switch 107, the rear limit switch 108 and the lock PS17, and since there are three types of state detection switches, there are eight combinations, and the amount of messages stored in the R-table 28 is larger than that of the Z-table 29.

The clamp devices of the in-block manual slide type and the in-block automatic slide type have the state detection switches corresponding to the T-slot manual type clamp device and the T-slot automatic slide type clamp device, respectively. In this way, the clamp device varies depending on types, but at least two or more types of state detection switches are mounted.

The following table shows the contents of the P-table 26. The P-table 26 is applied to the clamp devices using the T-slot automatic slide type having the mechanical lock mechanism.

Table 1 shows the contents of messages stored in the P-table 26 in the power supply initial state of the injection molding machine 1. In the power supply initial state, the injection molding machine 1 is turned in a mold replacement mode.

In the following table, the lock LSPS is displayed as "ON" when both the lock LS113 and the lock PS17 are ON (AND condition), and as "OFF" when one of the lock LS113 and the lock PS17 is "OFF". The release PSLS is also the same. The tables are common to the clamp devices of the movable platen 4a and the fixed platen 4b. Although neither lock PS17 nor release PS18 is a state detection switch mounted on the clamp device 100, information of the lock PS17 and the release PS18 is also taken into the table by setting the AND condition of the lock LS113 and the release LS114. Besides, any one of the lock LS113 and the lock PS17 may be omitted. In this case, "ON" or "OFF" is displayed based on the detection result of the other switch of the lock LS113 and the lock PS17.

TABLE 1

/* 0: power supply initial state-mold exchange mode */

| | Imput | | | | |
|---|---|---|---|---|---|
| | Front Limit LS | Rear Limit LS | Release LSPS | Lock LSPS | Smartphone screen display message |
| Table No.0 | Off | Off | Off | Off | (In operation) Pressure is reduced, clamp position is unknown, and slider position is unknown. |
| Table No.1 | Off | Off | Off | On | (Abnormal) Pressure is incresed, and slider is not at mold clamp position at lock position or forward limit switch is broken. |
| Table No.2 | Off | Off | On | Off | (In operation) Pressure is reduced, release pressure is normal, and slider is operating at release position. |
| Table No.3 | Off | Off | On | On | (Sensor abnormal) Pressure is increased, clamp position is abnormal, both lock and release are ON, and slider is operating. |
| Table No.4 | Off | On | Off | Off | (Abnormal) Pressure is reduced, clamp position is unknown, and slider is at rearward position. |
| Table No.5 | Off | On | Off | On | (Sensor abnormal) Pressure is increased, and slider is at rearward position at lock position. |
| Table No.6 | Off | On | On | Off | (Normal) Release pressure is normal, releasing is completed when slider is at rearward position at release position. |
| Table No.7 | Off | On | On | On | (Sensor abnormal) Pressure is increased, clamp position is abnormal, both lock and release are ON, and slider is at rearward position. |
| Table No.8 | On | Off | Off | Off | (Abnormal) Pressure is reduced, clamp position is unknown, and slider is at mold clamp position. |
| Table No.9 | On | Off | Off | On | (Normal) Lock pressure is normal, and locking is completed when slider is at mold clamp position. |
| Table No.10 | On | Off | On | Off | (In operation) Pressure is reduced, and slider is at mold clamp position at release position. |
| Table No.11 | On | Off | On | On | (Sensor abnormal) Pressure is increased, clamp position is abnormal, both lock and release are ON, and slider is at forward position. |
| Table No.12 | On | On | Off | Off | (Sensor abnormal) Pressure is reduced, clamp position is unknown, slider position is abnormal, and both forward limit and rearward limit are ON. |
| Table No.13 | On | On | Off | On | (Sensor abnormal) Pressure is increased, slider position is abnormal at lock position, and both forward limit and rearward limit are ON. |
| Table No.14 | On | On | On | Off | (Sensor abnormal) Pressure is reduced, slider position is abnormal at release position, and both forward limit and rearward limit are ON. |
| Table No.15 | On | On | On | On | (Sensor abnormal) Pressure is reduced, clamp position is abnormal, both lock and release are ON, slider position is abnormal, and forward limit and rearward are ON. |

Table 2 also shows the contents of the messages of the P-table 26 in the power supply initial state of the control unit 9, and indicates that the injection molding machine 1 is in operation (in a state where injection molding is executable and not in a mold replacement mode). Since the power supply is in an initial state, the lock is in an uncompleted state.

TABLE 2

/* 0: power supply initial state-mold exchange mode */

| | Imput | | | | |
|---|---|---|---|---|---|
| | Front Limit LS | Rear Limit LS | Release LSPS | Lock LSPS | Smartphone screen display message |
| Table No.0 | Off | Off | Off | Off | (In operation) Pressure is reduced, clamp position is unknown, and slider position is unknown. |
| Table No.1 | Off | Off | Off | On | (Abnormal) Pressure is incresed, and slider is not at mold clamp position at lock position or forward limit switch is broken. |
| Table No.2 | Off | Off | On | Off | (In operation) Release pressure is normal, and slider is operating at release position. |
| Table No.3 | Off | Off | On | On | (Sensor abnormal) Pressure is increased, clamp position is abnormal, both lock and release are ON, and slider is operating. |
| Table No.4 | Off | On | Off | Off | (Abnormal) Pressure is reduced, clamp position is unknown, and slider is at rearward position. |
| Table No.5 | Off | On | Off | On | (Sensor abnormal) Pressure is increased, and slider is at rearward position at lock position. |
| Table No.6 | Off | On | On | Off | (Normal) Release pressure is normal, releasing is completed when slider is at rearward position at release position. |
| Table No.7 | Off | On | On | On | (Sensor abnormal) Pressure is increased, clamp position is abnormal, both lock and release are ON, and slider is at rearward position. |
| Table No.8 | On | Off | Off | Off | (Abnormal) Pressure is reduced, clamp position is unknown, and slider is at mold clamp position. |
| Table No.9 | On | Off | Off | On | (Normal) Lock pressure is normal, and locking is completed when slider is at mold clamp position. |
| Table No.10 | On | Off | On | Off | (In operation) Pressure is reduced, and slider is at mold clamp position at release position. |
| Table No.11 | On | Off | On | On | (Sensor abnormal) Pressure is increased, clamp position is abnormal, both lock and release are ON, and slider is at forward position. |
| Table No.12 | On | On | Off | Off | (Sensor abnormal) Pressure is reduced, clamp position is unknown, slider position is abnormal, and both forward limit and rearward limit are ON. |
| Table No.13 | On | On | Off | On | (Sensor abnormal) Pressure is increased, slider position is abnormal at lock position, and both forward limit and rearward limit are ON. |
| Table No.14 | On | On | On | Off | (Sensor abnormal) Pressure is reduced, slider position is abnormal at release position, and both forward limit and rearward limit are ON. |
| Table No.15 | On | On | On | On | (Sensor abnormal) Pressure is reduced, clamp position is abnormal, both lock and release are ON, slider position is abnormal, and forward limit and rearward are ON. |

Table 3 shows the contents of the messages of the P-table 26 in the mold replacement mode of the control unit 9. In the mold clamp system, since the lock button 22*a* (or 22*b*) of the control unit 9 is pressed, the state of the clamp is a "clamped state".

TABLE 3

/* 2: mold exchange mode, locking operation */

| | Imput | | | | |
|---|---|---|---|---|---|
| | Front Limit LS | Rear Limit LS | Release LSPS | Lock LSPS | Smartphone screen display message |
| Table No.0 | Off | Off | Off | Off | (In operation) Pressure is reduced, clamp position is unknown, and slider position is unknown. |
| Table No.1 | Off | Off | Off | On | (Abnormal) Pressure is incresed, and slider is not at mold clamp position at lock position or forward limit switch is broken. |
| Table No.2 | Off | Off | On | Off | (In operation) Release pressure is normal, and slider is operating at release position. |
| Table No.3 | Off | Off | On | On | (Sensor abnormal) Pressure is increased, clamp position is abnormal, both lock and release are ON, and slider is operating. |
| Table No.4 | Off | On | Off | Off | (Abnormal) Pressure is reduced, clamp position is unknown, and slider is at rearward position. |
| Table No.5 | Off | On | Off | On | (Sensor abnormal) Pressure is increased, and slider is at rearward position at lock position. |
| Table No.6 | Off | On | On | Off | (Normal) Release pressure is normal, releasing is completed when slider is at rearward position at release position. |
| Table No.7 | Off | On | On | On | (Sensor abnormal) Pressure is increased, clamp position is abnormal, both lock and release are ON, and slider is at rearward position. |
| Table No.8 | On | Off | Off | Off | (Abnormal) Pressure is reduced, clamp position is unknown, and slider is at mold clamp position. |
| Table No.9 | On | Off | Off | On | (Normal) Lock pressure is normal, and locking is completed when slider is at mold clamp position. |
| Table No.10 | On | Off | On | Off | (In operation) Pressure is reduced, and slider is at mold clamp position at release position. |
| Table No.11 | On | Off | On | On | (Sensor abnormal) Pressure is increased, clamp position is abnormal, both lock and release are ON, and slider is at forward position. |
| Table No.12 | On | On | Off | Off | (Sensor abnormal) Pressure is reduced, clamp position is unknown, slider position is abnormal, and both forward limit and rearward limit are ON. |
| Table No.13 | On | On | Off | On | (Sensor abnormal) Pressure is increased, slider position is abnormal at lock position, and both forward limit and rearward limit are ON. |
| Table No.14 | On | On | On | Off | (Sensor abnormal) Pressure is reduced, slider position is abnormal at release position, and both forward limit and rearward limit are ON. |
| Table No.15 | On | On | On | On | (Sensor abnormal) Pressure is reduced, clamp position is abnormal, both lock and release are ON, slider position is abnormal, and forward limit and rearward are ON. |

Table 4 shows the contents of the messages of the P-table 26 in the mold replacement mode by the control unit 9. In the mold clamp system, since the release button 23a (or 23b) of the control unit 9 is pressed, the state of the clamp is "unclamped state".

TABLE 4

/* 3: mold exchange mode, releasing operation */

| | Imput | | | | |
|---|---|---|---|---|---|
| | Front Limit LS | Rear Limit LS | Release LSPS | Lock LSPS | Smartphone screen display message |
| Table No.0 | Off | Off | Off | Off | (In operation) Pressure is reduced, clamp position is unknown, and slider position is unknown. |
| Table No.1 | Off | Off | Off | On | (Abnormal) Pressure is incresed, and slider is not at mold clamp position at lock position or forward limit switch is broken. |
| Table No.2 | Off | Off | On | Off | (In operation) Release pressure is normal, and slider is operating at release position. |
| Table No.3 | Off | Off | On | On | (Sensor abnormal) Pressure is increased, clamp position is abnormal, both lock and release are ON, and slider is operating. |
| Table No.4 | Off | On | Off | Off | (Abnormal) Pressure is reduced, clamp position is unknown, and slider is at rearward position. |
| Table No.5 | Off | On | Off | On | (Sensor abnormal) Pressure is increased, and slider is at rearward position at lock position. |
| Table No.6 | Off | On | On | Off | (Normal) Release pressure is normal, releasing is completed when slider is at rearward position at release position. |
| Table No.7 | Off | On | On | On | (Sensor abnormal) Pressure is increased, clamp position is abnormal, both lock and release are ON, and slider is at rearward position. |
| Table No.8 | On | Off | Off | Off | (Abnormal) Pressure is reduced, clamp position is unknown, and slider is at mold clamp position. |
| Table No.9 | On | Off | Off | On | (Normal) Lock pressure is normal, and locking is completed when slider is at mold clamp position. |
| Table No.10 | On | Off | On | Off | (In operation) Pressure is reduced, and slider is at mold clamp position at release position. |
| Table No.11 | On | Off | On | On | (Sensor abnormal) Pressure is increased, clamp position is abnormal, both lock and release are ON, and slider is at forward position. |
| Table No.12 | On | On | Off | Off | (Sensor abnormal) Pressure is reduced, clamp position is unknown, slider position is abnormal, and both forward limit and rearward limit are ON. |
| Table No.13 | On | On | Off | On | (Sensor abnormal) Pressure is increased, slider position is abnormal at lock position, and both forward limit and rearward limit are ON. |
| Table No.14 | On | On | On | Off | (Sensor abnormal) Pressure is reduced, slider position is abnormal at release position, and both forward limit and rearward limit are ON. |
| Table No.15 | On | On | On | On | (Sensor abnormal) Pressure is reduced, clamp position is abnormal, both lock and release are ON, slider position is abnormal, and forward limit and rearward are ON. |

Table 5 shows the contents of the messages of the P-table 26 in an operation mode (a molding machine operation mode) of the control unit.

TABLE 5

/* 4 in operation */

| | Input | | | | |
|---|---|---|---|---|---|
| | Front Limit LS | Rear Limit LS | Release LSPS | Lock LSPS | Smartphone screen display message |
| Table No.0 | Off | Off | Off | Off | (Abnormal) Pressure is reduced, clamp position is unknown, and slider position is unknown. |
| Table No.1 | Off | Off | Off | On | (Abnormal) Pressure is incresed, and slider is not at mold clamp position at lock position or forward limit switch is broken. |
| Table No.2 | Off | Off | On | Off | (Abnormal) Pressure is reduced, and release position and slider position are unknown. |
| Table No.3 | Off | Off | On | On | (Sensor abnormal) Pressure is increased, clamp position is abnormal, both lock and release are ON, and slider is operating. |
| Table No.4 | Off | On | Off | Off | (Abnormal) Pressure is reduced, clamp position is unknown, and slider is at rearward position. |
| Table No.5 | Off | On | Off | On | (Sensor abnormal) Pressure is increased, and slider is at rearward position at lock position. |
| Table No.6 | Off | On | On | Off | (Abnormal) Pressure is reduced, and release position and slider position are abnormal (at rearward position). |
| Table No.7 | Off | On | On | On | (Sensor abnormal) Pressure is increased, clamp position is abnormal, both lock and release are ON, and slider is at rearward position. |
| Table No.8 | On | Off | Off | Off | (Abnormal) Pressure is reduced, clamp position is unknown, and slider is at mold clamp position. |
| Table No.9 | On | Off | Off | On | (Normal) Lock pressure is normal, and locking is completed when slider is at mold clamp position. |
| Table No.10 | On | Off | On | Off | (Abnormal) Pressure is reduced, and slider is at mold clamp position at release position. |
| Table No.11 | On | Off | On | On | (Sensor abnormal) Pressure is increased, clamp position is abnormal, both lock and release are ON, and slider is at forward position. |
| Table No.12 | On | On | Off | Off | (Sensor abnormal) Pressure is reduced, clamp position is unknown, slider position is abnormal, and both forward limit and rearward limit are ON. |
| Table No.13 | On | On | Off | On | (Sensor abnormal) Pressure is increased, slider position is abnormal at lock position, and both forward limit and rearward limit are ON. |
| Table No.14 | On | On | On | Off | (Sensor abnormal) Pressure is reduced, slider position is abnormal at release position, and both forward limit and rearward limit are ON. |
| Table No.15 | On | On | On | On | (Sensor abnormal) Pressure is reduced, clamp position is abnormal, both lock and release are ON, slider position is abnormal, and forward limit and rearward are ON. |

Since the number of state detection switches of the clamp device 100 is four, there is 16 combinations of states of the switches. For each of them, the manufacturer of the mold clamp system anticipates all the combinations in a recursive method in advance, and defines the diagnostic states of the clamp device for the P-table 26 as the contents of the message without no omissions. The contents of the message are comparable to the contents of the diagnostic know-how of the manufacturer of the mold clamp system. The contents of the message are similarly determined for the Q-table 27, the R-table 28, and the Z-table 29.

Figure 6A:
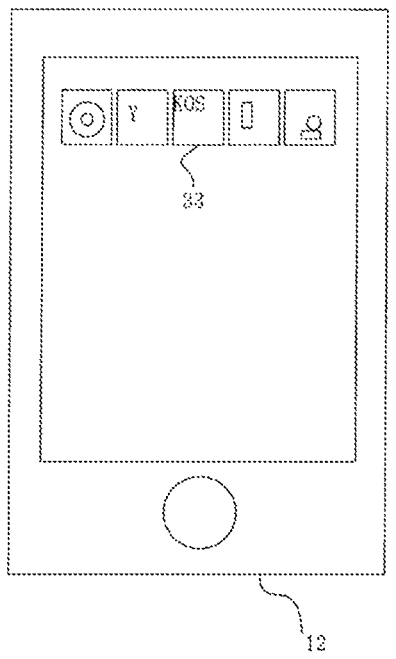
FIGS. 6A, 6B, 6C and 6D each illustrating an operation of the remote diagnostic program downloaded to a smartphone.
Figure 6B:
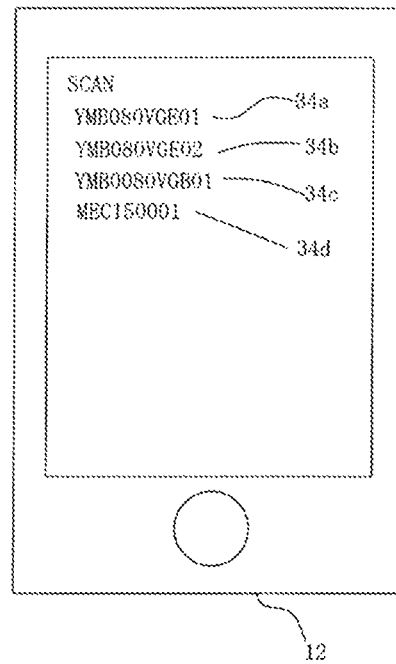

FIGS. 6A to 6D show an operation of the remote diagnostic program 25 downloaded to the smartphone 12. The remote diagnostic program 25 communicates with the main body side communication unit 9d of the control unit 9 to read the status of the main body, the clamp status, the ON/OFF state of each status detection switch, and the time from the main body side memory 9e through a short-distance wireless communication. When the remote diagnostic program 25 is started by the icon 33 in FIG. 6A, a list of devices that can perform short-range wireless communication is displayed. In a manufacturing site F (FIG. 1A), a plurality of injection molding machines 1 are present, and identification information 34a to 34d that the injection molding machines respectively have are displayed (FIG. 6B). The identification information 34a to 34c is for a control unit of the clamp device using hydraulic pressure, and the identification information 34d is for a control unit for controlling the magnet clamp. In these identification information, what type of clamp device is connected is specified, thereby having the remote diagnostic program 25 know what type of clamp device is connected.

Figure 6C:
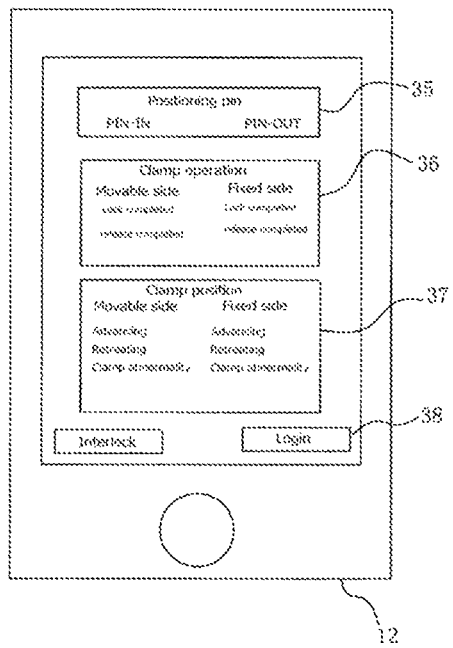
Figure 6D:
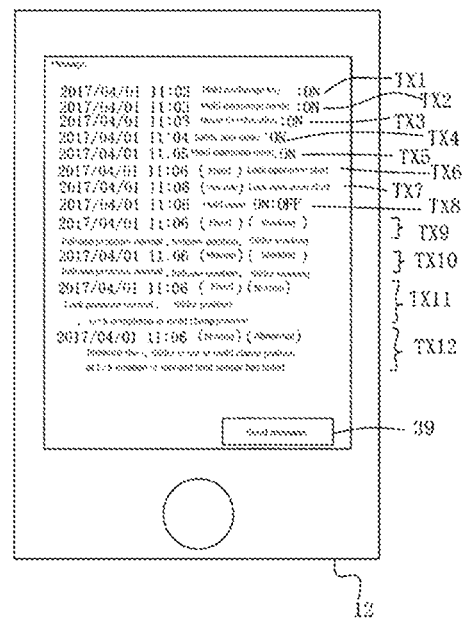

When the operator selects one piece of identification information, a screen shown in FIG. 6C is displayed. On window screens of a positioning pin 35, a clamp operation 36, and a clamp position 37, phrases such as "pin extracting", "lock completed", "release completed", "advancing", "retreating", and "clamp abnormality" are shown, and are highlighted for the corresponding operations. A "login" button 38 is to read the status of the main body, the clamp status, the ON/OFF status of each status detection switch, and the time from the main body side memory 9e as history for the period from power-on of the injection molding machine 1 to the present. When the "login" button 38 is selected, histories shown in FIG. 6D are imported to the smartphone 12.

The smartphone 12 selects one of the P-table 26, the Q-table 27, the R-table 28, and the Z-table 29 according to the status of the main body and the clamp status, and reads out and displays a message corresponding to the ON/OFF state of the state detection switch. In this example, since the control unit 9 selected by the smartphone 12 based on the identification information controls the clamp device of the T-slot manual slide having the mechanical lock mechanism, the remote diagnostic program 25 selects the P-table 26 on the portable memory 12e. Then, since the injection molding machine 1 is in the mold exchanging mode and the lock button 22a (or 22b) is pressed to make a transition from unclamping to clamping, Table 3 of the P-table is selected. The messages TX9 and TX10 correspond to messages in the third row of Table 3, the message TX11 is a message in the tenth row thereof, and the message TX12 is a message in the second row thereof. These indicate an abnormality that the housing 102 of the clamp device is not at a proper position for clamping even though only the lock LSPS is in the ON state. Besides, the messages TX1 to TX8 indicate the process of the operation of the clamp device in chronological order, and the explanation thereof will be omitted.

As described above, according to the present embodiment, by anticipating all combinations in advance by a recursive method for the combinations of all outputs of the forward limit switch 107, the rearward limit switch 108, the lock LS 113, the release LS 114, the lock PS 17, and the release PS 18, the state of the main body of the injection molding machine, and the clamp status, and by defining the diagnostic states of the clamp device to those combinations as the contents of message without omissions, unexpected conditions are eliminated and message contents that can build a highly reliable system can be provided. The work manager refers to the message contents, thereby enabling the correspondence on the working site to quickly correspond.

When the work manager selects a message transmission button 39, the status of the main body, the clamp status, and the information of the state detection switch transmitted from the control unit 9 to the smartphone 12 are sent to the maintenance department 32 of the mold clamp system manufacturer through the network 31 by e-mail. The maintenance department that has received the e-mail can examine and prepare for a countermeasure in advance before arriving at the manufacturing site.

Figure 7A:
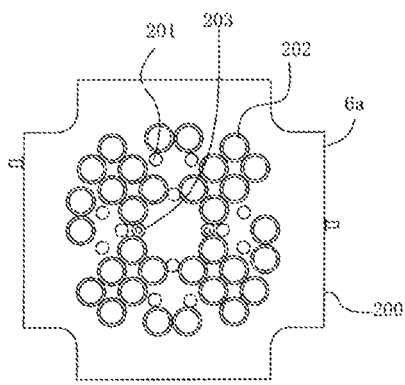
FIGS. 7A, 7B, 7C, 7D and 7E each showing an example in which a magnet clamp is mounted as a mechanism of the clamp device.
Figure 7B:
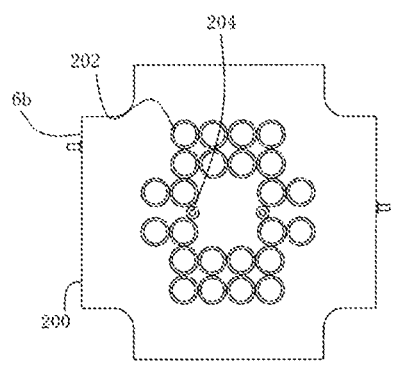

Next, an example in which a magnet clamp 200 is mounted as a mechanism of the clamp devices 6a, 6b will be described with reference to FIGS. 7A to 7E. FIG. 7A is a front view of the magnet clamp 200 as the clamp device 6a at a movable platen side, and FIG. 7B is a front view of the magnet clamp 200 as the clamp device 6b at a fixed platen side. The magnet clamp 200 as the clamp device 6a at the movable platen side has a through hole 201 through which the ejector rod 10 passes, but the magnet clamp 200 as the clamp device 6b at the fixed platen side does not have the through hole 201. The clamp devices 6a, 6b have substantially the same configuration except that the arrangement patterns of magnet blocks 202 are different. A large number of magnet blocks 202 are arranged on the surface of the magnet clamp 200. Each magnet block 202 has magnets that polarity cannot be reversed and magnets that polarity can be reversed (these magnets include alnico magnets, iron/chromium/cobalt magnets, and other magnets. Hereinafter, the alnico magnets will be described as an example), and can be switched between a magnetic circuit that closes (demagnetizes) in the plate and a magnetic circuit that passes through the mold (magnetizes) by controlling the magnetic polarity of the alnico magnet with a coil. Proximity sensors 203, 204 for detecting the proximity state of the mold on the surface of the magnet clamp 200 are provided on the clamp devices 6a, 6b, respectively.

Figure 7C:
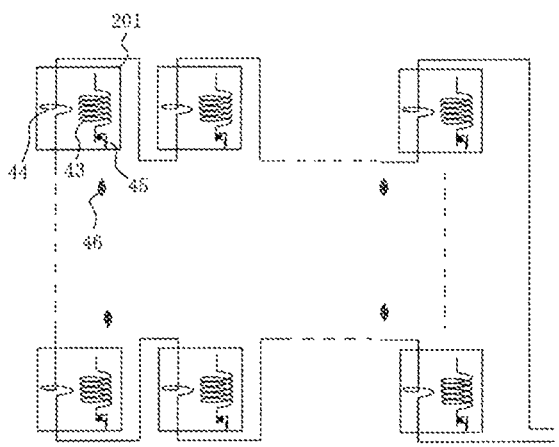

FIG. 7C shows an electric circuit of the magnet block 202 on one side of the clamp devices 6a, 6b. A magnetizing coil 43 for reversing the magnetic polarity of an alnico magnet (not shown), a sensor coil 44 for measuring an attractive force, and a current sensor 45 for measuring a current value of the magnetizing coil 43 are arranged on each magnet block 202. Here, the sensor coil 44 is wound around a magnetic circuit passing through the alnico magnet to detect a change of the magnetic flux. The sensor coils 44 of the magnet blocks 202 are serially connected, and each of the clamp devices 6a, 6b can perform one detection. The magnet clamp 200 is divided into a plurality of regions in advance, in which temperature sensors 46 for measuring the temperature of the regions are provided respectively.

Figure 7D:
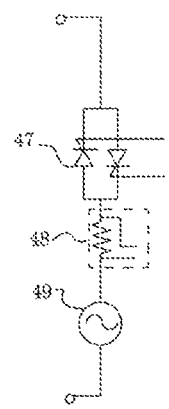

FIG. 7D shows a power supply for driving the magnetizing coil 43 of the whole magnet block 202 on one side of the clamp device 6a or the clamp device 6b. The power supply full-wave rectifies an external AC power supply 49 with a thyristor 47. A current detector 48 measures the current flowing through the thyristor 47 based on terminal voltage of the resistor.

In summary, the detectors provided on the magnet clamp 200 as the clamp device 6a or the clamp device 6b are firstly the proximity sensors 203, 204 and a current detector 48 for measuring the whole current, and further, a large number of temperature sensors 46 respectively provided for areas of the magnet clamp 200, current sensors 45 and sensor coils 44 respectively provided for the magnet blocks 202. The magnet clamp 200 also includes detectors that can detect not only binary values of on and off but also intermediate values, which are different from the state detection switches of the clamp devices 6a, 6b of T-slot manual type, T-slot automatic slide type, manual slide type in block, automatic slide type in block, block fixed type, and type having mechanical lock mechanism.

Returning to FIG. 5, the control unit 9 stores an upper limit value of the detection current of the current detector 48, an upper limit value and a lower limit value of the current of each current sensor 45, a set temperature and a specified temperature of the temperature sensor 46, and a set value of the induction current of the sensor coil 44 (hereinafter, collectively referred to as "reference values") in the main body side memory 9e. Here, the upper limit value for the detection current of the current detector 48 is, for example, 5 amperes, and is used as a criterion for determining whether a short circuit has occurred due to insulation deterioration or damage to the thyristor 47. The upper limit value and the lower limit value for each current sensor 45 are, for example, 30% or more of a design value or 30% or less thereof, and are used as a criterion for determining deterioration of the magnetized coil 43. In magnetically attracting and fixing the mold to the fixed platen and the movable platen, when the induction current flowing through a sensor coil which is a coil similar to the sensor coil 44 but different from the sensor coil falls below 75% of the reference value, it is determined that the mold is abnormal. The set temperature and the specified temperature of the temperature sensor 46 are, for example, 110° C. for the set temperature and 122° C. for the specified temperature. The specified temperature is a temperature which a magnetic holding force of the magnet is easily lost, and the set temperature is a temperature which warns that the temperature is approaching the specified temperature. The set value for the sensor coil 44 is made, for example, 25% loss of magnetic force. When the magnetic force is lost, the magnetic flux fluctuates, and the sensor coil 44 detects the electromotive force generated by the magnetic flux fluctuation. The voltage and the fluctuation time are integrated to be converted to a lost magnetic flux.

The control unit 9 generates a three-digit error code based on the reference value and stores it in the main unit side memory 9e. The error codes are shown in the table below in the column marked as Indication.

TABLE 6

| Clasification | Indication | | | Content | Cause and Solution |
|---|---|---|---|---|---|
| Load | U | S | | Current value during fixed side operation exceeds the upper limit. | Turn on the power again. There is insulation deterioration/deterioration/ short circuit of the coil in the plate, and abnormality between the control panel and the plate wiring. Or, the power supply voltage may fluctuate. Check the power supply voltage. |
| | | M | | Current value during movable side operation exceeds the upper limi. | |
| | L | S | | Current value during fixed side operation exceeds the lower limit. | |
| | | M | | Current value during movable side operation exceeds the lower limi.t | |
| | E | | 1 | Drive circuit leak current is generated inside the control panel. | |
| Mold | F | S | | The fixed mold abnormal detection section is below the set value. | Release the mold on the error side. Check that there is no gap or rust on the back side of the mold near the mold abnormality detection section. |
| | | M | | The morvable mold abnormal detection section is below the set value. | |
| Temperature | t | 0 | | Fixed side temperature is approaching the upper limit of the specified temperature of the plate. Movable side temperature is approaching the upper limit of the specified temperature of the plate. | Plate temperature is rising. Reduce the temperature of the plate. |
| | | 1 | | Fixed side temperature exceeds the upper limit of the specified temperature of the plate. Movable side temperature exceeds the upper limit of the specified temperature of the plate. | |
| Sensor | E | 4 | 1 | Fixed side proximity detection has been turned OFF. | Release the mold on the target side and restore the presence. |
| | | | 2 | Movable side proximity detection has been turned OFF. | Check that there is no gap or rust on the back side of the mold near the proximity detection. |
| | | | 3 | Fixed side proximity detection has been turned OFF once and turned ON again. | Detection of mold peeling. Check that it is within the specification range. Or, check if there is any abnormality in the wiring. |
| | | | 4 | Movable side proximity detection has been turned OFF once and turned ON again. | |
| Attractive force | E | 5 | 1 | Fixed side magnetizing force is smaller than the default magnetizing force. | Check that it is not smaller than the default magnetizing force (25% of the plate clamping capacity). |

TABLE 6-continued

| Clasification | Indication | Content | Cause and Solution |
|---|---|---|---|
| | 2 | Movable side magnetizing force is smaller than the default magnetizing force. | Or, check if there is any abnormality in the attractive force detection coil or wiring. |

Explaining the error code, the third digit indicates classifications. Various codes of classifications U, L, F, t, and E are defined. The classifications U and L are codes indicating a load abnormality, the former indicating an error exceeding the upper limit value, and the latter indicating an error below the lower limit value. The classification F is a code indicating a mold abnormality. The classification t is a code indicating a temperature abnormality. The classification E is a code indicating an abnormal attractive force.

The second and first digits indicate the location of each error.

In the classification U, the second digit indicates whether the current sensor 45 that has detected the error exists on the fixed platen 4b or the movable platen 4a, or is the current detector 48. The first digit is a unique number assigned to the current sensor 45. The "S" in the second digit indicates that the current sensor 45 is on the fixed platen 4b side. The second digit "M" indicates that the current sensor 45 is on the movable platen 4a side. The second digit "E" indicates that the current detector 48 is used. Since there is one current detector 48 in the magnet clamp 200, the first digit is "1".

In the classification F, when the current sensor 45 detects a current value of 75% or less indicating a mold abnormality, the second digit indicates the type of the fixed platen 4b or the movable platen 4a, and the first digit indicates the number of the current sensor 45 in which an error has occurred.

In the classification t, "0" in the second digit indicates that the temperature has exceeded the set temperature, and "1" indicates that the temperature has exceeded the specified temperature. The first digit indicates the number of the temperature sensor 46 where the error has occurred. Besides, the number of the temperature sensor 46 is a number that can be specified by the first digit even if the number of the fixed platens 4b and the number of the movable platens 4a are added.

The classification E indicates the sensor abnormality or another abnormality of the attractive force abnormality. The second digit indicates the type of abnormality, where "4" is a sensor abnormality and "5" is an attractive force abnormality. In the sensor abnormality "4", the first digit indicates the detection state of the proximity sensors 203, 204 including a temporal element. In the attractive force abnormality "5", the first digit indicates which of the sensor coils 44 of the fixed platen 4b and the movable platen 4a has detected the abnormality.

In FIG. 5, the remote diagnostic program 25 downloaded to the portable memory 12e stores messages about "contents" and "cause and countermeasure" for the error code in an MG table 42. The specific contents of "contents" and "cause and countermeasure" are as shown in Table 6.

Figure 7E:
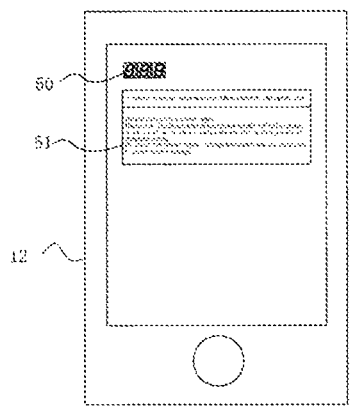

In FIG. 7E, the smartphone 12 reads out and displays a message corresponding to the error code from the MG table. In this example, since the control unit 9 selected by the smartphone 12 based on identification information controls the magnet clamp, the remote diagnostic program 25 selects the MG table 42.

FIG. 7E shows contents displayed on the smartphone 12. The display unit 9b indicates the "contents" and "cause and countermeasures" selected from Table 6 based on the three-digit error code 50 on a window 51 together with the error code.

When the remote diagnostic system diagnoses that the magnet clamp is abnormal, the remote diagnostic system can indicate possible causes similarly to the above-described clamp devices other than the magnet clamp, and then further provide an operator with next possible operations. The smartphone 12 holds and displays magnet clamp abnormal messages (S tables described later) for the initial power state of the injection molding machine 1, the operation of the injection molding machine 1 (in a state where the injection molding can be performed, not in the mold replacement mode), the mold replacement mode and the (molding machine) operation mode. In this case, in the other clamp devices described above, it is possible to determine whether the mold is locked or released according to the ON/OFF state of each state detection switch. On the other hand, since the magnet clamp 200 does not have a state detection switch corresponding to the state detection switch of the clamp device, it is necessary to separately create information corresponding to this.

Figure 8:
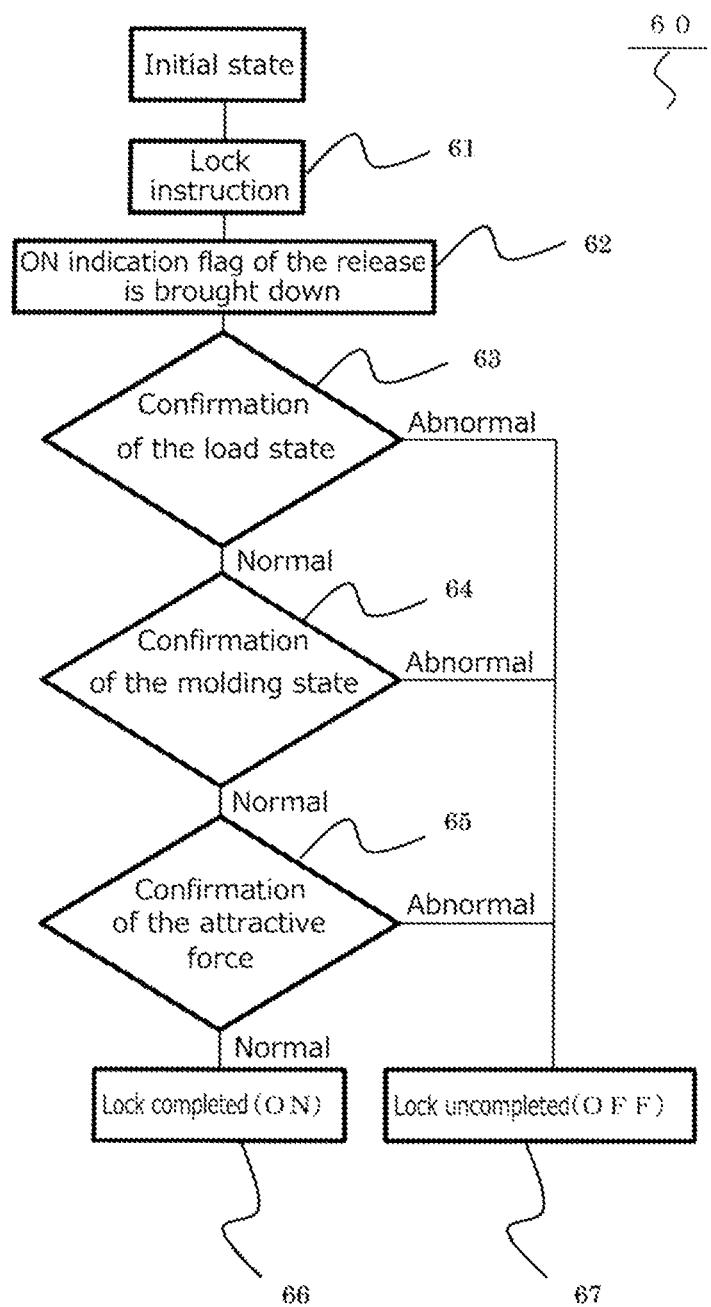
FIG. 8 is a figure showing a processing program for detecting whether a mold is locked.
Figure 9:
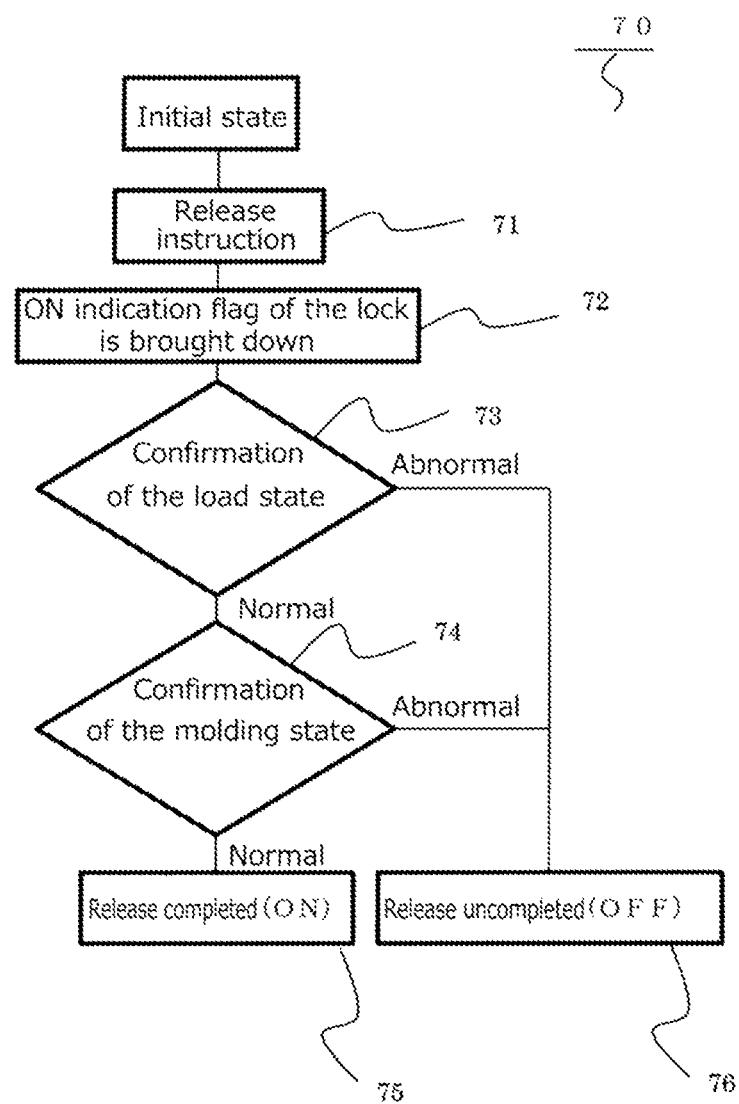
FIG. 9 is a figure showing a processing program for detecting whether a mold is released.

FIG. 8 and FIG. 9 show two processing programs (a lock completion state detection unit 60 and a release completion state detection unit 70) for detecting whether the mold is locked (hereinafter, referred to as "lock completed") or released (hereinafter, referred to as "release completed"). These are executed by the control unit 9. FIG. 8 shows a flow of the lock completion state detection unit. The lock completion state detection unit 60 detects ON/OFF of "lock completed". Besides, the ON/OFF of "lock completed" is a binary representation of the processing result, such as the output from the state detection switch. A lock display flag F1 and a release display flag F2 (see FIG. 5) are provided in the main body side memory 9e.

The control unit 9 stores, similarly to the clamp devices other than the magnet clamp described above, the state of the main body after the power of the injection molding machine 1, whether the magnet clamp is in the clamped state or the unclamped state, each normal/abnormal state (ON/OFF state) when the state of "lock completed" or "release completed" changes, information indicating the proximity/separation of the proximity sensors 203, 204 as ON/OFF, and the time in the main body side memory 9e.

When the lock button 22a (or 22b) is pressed, a lock command is issued, and the control unit 9 drives the magnetizing coil 43 of the magnet clamp 200 to put the magnet clamp 200 in a magnetized state. On the other hand, when the control unit 9 receives the lock command (step 61), the control unit 9 lowers (deletes) the "release ON display flag F2" of the main body side memory 9e to delete the previous state (step 62). Next, the load state, the mold state, and the attractive force are checked. These are performed based on error codes generated by the control unit 9.

As described above, the load states (classification U, classification L) are determined based on the detection result of the current sensor 45 and the current detector 48, and the mold state (classification F) is determined by the detection result of the current sensor 45, and the attractive force (classification E) is determined based on the detection result of the sensor coil 44.

It is detected whether an abnormal error code has been generated in the "Load" item of the error code classification (step 63). If an abnormal error code has been generated, the "Lock display flag F1" is set to "OFF" as lock not completed (step 67). Next, it is detected whether an abnormal error code has been generated in the "Mold" item of the error code classification (step 64). If an abnormal error code has been generated, the "Lock display flag F1" is set to "OFF" as lock not completed (step 67). Then, it is detected whether an abnormal error code has been generated in the "Attractive force" item in the error code classification (step 65). If an abnormal error code has been generated, the "Lock display flag F1" is set to "OFF" as lock not completed (step 67). Otherwise, the "Lock display flag F1" is set to "ON" as lock completed (step 66).

FIG. 9 shows a flow of a release completion state detection unit 70. The release completed state detection unit detects ON/OFF of "Release completed". When the release button 23*a* (or 23*b*) is pressed, a release command is issued, and the control unit 9 drives the magnetizing coil 43 of the magnet clamp 200 to put the magnet clamp 200 in a demagnetized state. On the other hand, when receiving the release command (step 71), the control unit 9 resets (erases) the "Lock display flag F1" of the main body side memory 9*e* to erase the previous state (step 72). Next, the load state is confirmed. This is also performed based on the error code generated by the control unit 9. It is detected whether an abnormal error code has been generated in the "Load" item of the error code classification (step 73). If an abnormal error code has been generated, the "Release display flag F2" is set to "OFF" as release not completed (step 76). Next, it is detected whether an abnormal error code has been generated in the "Mold" item of the error code classification (step 74). If an abnormal error code has been generated, the "Release display flag F2" is set to "OFF" as release not completed (step 76). Otherwise, the "Release display flag F2" is set to "ON" as release completed (step 75).

Messages are stored for each state that can be combined by the ON/OFF state due to the three state detectors of the "Lock display flag F1", the "Release display flag F2" and a proximity sensor 203 (or 204). The proximity sensor 203 (or 204) is provided on the surface of the magnet clamp and outputs a mold detection signal (ON) when the distance from the sensor to the mold is within a predetermined range. Otherwise, it is OFF.

The following table shows contents of the S-table 52. The S-table 52 is applied to the magnet clamp 200. In the case of the magnet clamp 200, there are three ON/OFF states detected respectively by the lock completion state detection unit 60, the release completion state detection unit 70 and the proximity sensor 203 (or 204). Therefore, there are eight combinations of states.

Table 7 shows contents of the messages stored in the S-table 52 in the initial state of the power supply of the injection molding machine 1. In the initial state of the power supply, the injection molding machine 1 is in a mold replacement mode.

TABLE 7

| | Proximity sensor | Release completed | Lock completed | Screen display message | Normal/Abnormal | Cause and Solution |
|---|---|---|---|---|---|---|
| Table No. 0 | Off | Off | Off | Clamp state is undefined. | Normal | — |
| Table No. 1 | Off | Off | On | Locked, status is OFF. | Normal | — |
| Table No. 2 | Off | On | Off | Release completed. | Normal | — |
| Table No. 3 | Off | On | On | Clamp state is abnormal. | Abnormal | Clamp state is abnormal. Perform the release operation to make it normal |
| Table No. 4 | On | Off | Off | Clamp state is undefined. | Normal | — |
| Table No. 5 | On | Off | On | Locked, status is ON. | Normal | — |
| Table No. 6 | On | On | Off | Released, status is ON. | Normal | — |
| Table No. 7 | On | On | On | Clamp state is abnormal. | Abnormal | Clamp state is abnormal. Perform the release operation to make it normal |

Table 8 also shows contents of the message in the S-table 52 in the initial state of the power supply of the control unit 9, but wherein the injection molding machine 1 is in operation (injection molding is executable, and not in the mold replacement mode). Since the power supply is in the initial state, the lock is not the completed state.

TABLE 8

1: Power supply initial state, Operating (Table to be referred when mold replacement is OFF in the lock incomplete state)

| | Proximity sensor | Release completed | Lock completed | Screen display message | Normal/ Abnormal | Cause and Solution |
|---|---|---|---|---|---|---|
| Table No. 0 | Off | Off | Off | Clamp state is undefined. | Abnormal | Clamp state is undefined. Perform the lock operation to make it normal. |
| Table No. 1 | Off | Off | On | Locked, status is OFF. | Abnormal | Release the mold target side and restore the status. Check that there is no gap or rust on the back side of the mold near the proximity detection. Detection of mold peeling. Check that it is within the specification range. Or, check for any abnormalities in the wiring. |
| Table No. 2 | Off | On | Off | Release completed. | Abnormal | Released during "Mold replacement OFF". Perform the lock operation to make it normal. |
| Table No. 3 | Off | On | On | Clamp state is abnormal. | Abnormal | Clamp state is abnormal. After performing the release operation, perform the lock operation to return to the normal state. |
| Table No. 4 | On | Off | Off | Clamp state is undefined. | Abnormal | Clamp state is undefined. Perform the lock operation to make it normal. |
| Table No. 5 | On | Off | On | Locked, status is ON. | Normal | — |
| Table No. 6 | On | On | Off | Released, status is ON. | Abnormal | Released during "Mold replacement OFF". Perform the lock operation to make it normal. |
| Table No. 7 | On | On | On | Clamp state is abnormal. | Abnormal | Clamp state is abnormal. After performing the release operation, perform the lock operation to return to the normal state. |

Table 9 shows contents of the messages in the S-table 52 in the mold replacement mode of the control unit 9. In the mold clamp system, since the lock button 22a (or 22b) of the control unit 9 is pressed, the clamp state is the "clamp state".

TABLE 9

2: Mold replacement mode, Lock operation

| | Proximity sensor | Release completed | Lock completed | Screen display message | Normal/ Abnormal | Cause and Solution |
|---|---|---|---|---|---|---|
| Table No. 0 | Off | Off | Off | Locked | Normal | — |
| Table No. 1 | Off | Off | On | Locked, status is OFF. | Normal | — |
| Table No. 2 | Off | On | Off | Release completed. | Normal | — |
| Table No. 3 | Off | On | On | Clamp state is abnormal. | Abnormal | Clamp state is abnormal. Perform the release operation to make it normal. |
| Table No. 4 | On | Off | Off | Locked | Normal | — |
| Table No. 5 | On | Off | On | Locked, status is ON. | Normal | — |
| Table No. 6 | On | On | Off | Released, status is ON. | Normal | — |
| Table No. 7 | On | On | On | Clamp state is abnormal. | Abnormal | Clamp state is abnormal. Perform the release operation to make it normal. |

Table 10 shows contents of the messages in the S-table 26 when the control unit is in the mold replacement mode. In the mold clamp system, the release button 23*a* (or 23*b*) of the control unit 9 is pressed, so that the clamp state is the "unclamped state".

TABLE 10

| | Proximity sensor | Release completed | Lock completed | Screen display message | Normal/ Abnormal | Cause and Solution |
|---|---|---|---|---|---|---|
| | 2: Mold replacement mode, Lock operation |
| Table No. 0 | Off | Off | Off | Locked | Normal | — |
| Table No. 1 | Off | Off | On | Locked, status is OFF. | Normal | — |
| Table No. 2 | Off | On | Off | Release completed. | Normal | — |
| Table No. 3 | Off | On | On | Clamp state is abnormal. | Abnormal | Clamp state is abnormal. Perform the release operation to make it normal. |
| Table No. 4 | On | Off | Off | Locked | Normal | — |
| Table No. 5 | On | Off | On | Locked, status is ON. | Normal | — |
| Table No. 6 | On | On | Off | Released, status is ON. | Normal | — |
| Table No. 7 | On | On | On | Clamp state is abnormal. | Abnormal | Clamp state is abnormal. Perform the release operation to make it normal. |

Table 11 shows contents of the messages in the S-table 52 when the control unit is in the (molding machine) operation mode.

TABLE 11

| | Proximity sensor | Release completed | Lock completed | Screen display message | Normal/ Abnormal | Cause and Solution |
|---|---|---|---|---|---|---|
| | 4: Ongoing (operating) |
| Table No. 0 | Off | Off | Off | Clamp state is undefined. | Abnormal | Clamp state is undefined. Perform the lock operation to make it normal. |
| Table No. 1 | Off | Off | On | Locked, status is OFF. | Abnormal | Release the mold target side and restore the status. Check that there is no gap or rust on the back side of the mold near the proximity detection. Detection of mold peeling. Check that it is within the specification range. Or, check for any abnormalities in the wiring. |
| Table No. 2 | Off | On | Off | Release completed. | Abnormal | Released during "Mold replacement OFF". Perform the lock operation to make it normal. |
| Table No. 3 | Off | On | On | Clamp state is abnormal. | Abnormal | Clamp state is abnormal. After performing the release operation, perform the lock operation to return to the normal state. |
| Table No. 4 | On | Off | Off | Clamp state is undefined. | Abnormal | Clamp state is undefined. Perform the lock operation to make it normal. |
| Table No. 5 | On | Off | On | Locked, status is ON. | Normal | — |
| Table No. 6 | On | On | Off | Released, status is ON. | Abnormal | Released during "Mold replacement OFF". Perform the lock operation to make it normal. |

TABLE 11-continued

| | Proximity sensor | Release completed | Lock completed | Screen display message | Normal/ Abnormal | Cause and Solution |
|---|---|---|---|---|---|---|
| | | | 4: Ongoing (operating) | | | |
| Table No. 7 | On | On | On | Clamp state is abnormal. | Abnormal | Clamp state is abnormal. After performing the release operation, perform the lock operation to return to the normal state. |

Returning to FIG. 6A, when the operator starts the remote diagnostic program 25 with the icon 33, a list of devices that can perform short-range wireless communication is displayed. When the operator selects the identification information 34d of the control unit for controlling the magnet clamp, the screen shown in FIG. 6C is displayed like other clamp devices. When the "login" button 38 is selected, history shown in FIG. 6D is collected on the smartphone 12. In this example, since the magnet clamp is controlled, the S-table 52 is selected. Then, one of Tables 7 to 11 is selected according to the mode of the injection molding machine 1, and corresponding messages are displayed on the display unit 12b.

In the above embodiment, the remote diagnostic program 25 is installed in the smartphone 12, which is possessed by the work manager H, to wirelessly read out the history of ON/OFF states of the state detection switch for the status of the main body and the clamp status from the main body side memory and display the diagnosis result. On the other hand, reading may be performed with a wired terminal device instead of a wireless terminal device such as the smartphone 12. For example, a terminal device having an arithmetic unit, a display unit, an input unit, a wired communication unit, and a memory is prepared, and the wired communication unit is provided in the control unit 9. A remote diagnostic program is set in the terminal device, the program is started, and the ON/OFF states of the state detection switch for the status of the main body and the clamp status from the main body side memory 9e may be read out through the wired communication unit of the control unit 9, and messages corresponding to the read history may be collected from the terminal side memory to be displayed on the display unit. In this case, for example, an existing connection method such as an RS-232C connection or a USB connection can be used for the wired communication with the control unit 9.

DESCRIPTION OF SYMBOLS

1 injection molding machine
2 movable crane
3 belt conveyor
4a platen, movable platen
4b platen, fixed platen
5 guide rod
6a, 6b clamp device
7 controller
9 control unit
9a arithmetic unit
9b display unit
9c input unit
9d main body side communication unit
9e main body side memory
10 ejector rod
12 smartphone
12a arithmetic unit
12b display unit
12c input unit
12d portable side communication unit
12e portable side memory
13 mold support block
15 air valve unit
16 hydraulic unit
22a, 22b lock button
23a, 23b release button
24 reset button
25 remote diagnostic program
26 P-table
27 Q-table
28 R-table
29 Z-table
30 mold replacement key
33 icon
34a to 34d identified information
36 clamp operation
37 clamp position
38 button
39 message transmission button
41 T-slot
42 MG table
43 magnetizing coil
44 sensor coil
45 current sensor
46 temperature sensor
47 thyristor
48 current detector
49 AC power supply
50 error code
51 window
52 S-table
60 lock completion state detection unit
70 release completion state detection unit
100 clamp device
101 T-leg
102 housing
103 clamp rod
103a clamping member
103b flange
103c inner piston
103d pressure receiving surface
104 guide hole
104a small-diameter portion (hole)
104b large-diameter portion (hole)
105 base
106 pneumatic cylinder
107 forward limit switch
108 rearward limit switch
109 output member
110 outer piston 111 collet
112a, 112b hook part
115 operating member
116 spring
200 magnet clamp
201 through hole
202 magnet block
203, 204 proximity sensor

The invention claimed is:

1. A remote diagnostic system of a mold handling device provided with a clamp device having an output member configured to move back and forth through a guide hole of a housing for mounting at least two kinds of state detection switches among a state detection switch for detecting an advance position in which the housing is close to a mold, a state detection switch for detecting a retreat position in which the housing is separated from the mold to a limit position, a state detection switch for detecting that the output member of the clamp device has locked the mold, a state detection switch for detecting whether the output member has released the mold, a state detection switch for detecting whether a hydraulic pressure for locking a clamp rod exceeds a threshold value for locking the clamp rod, and a state detection switch for detecting whether the hydraulic pressure for releasing the clamp rod exceeds a threshold value for releasing the clamp rod, wherein the remote diagnostic system, comprising:

a control unit, comprising:
　a main body side memory for storing an ON/OFF state of a state detection switch mounted on the clamp device together with a status of a main body of the mold handling device, a clamping status, and time information, wherein the status of the main body of the mold handling device includes information as to whether or not the main body of the mold handling device is in a mold replacement mode and the clamping status includes information as to whether the clamp device is in a clamped state or an unclamped state or other state wherein the other state is different from the clamped state and the unclamped state; and
　a main body side communication unit capable of short range wireless communication or wired communication; and a terminal device, comprising:
　a terminal side memory for storing messages for diagnosing failures for all possible combinations anticipated in advance by a recursive method without omission in the ON/OFF state of the state detection switch mounted on the clamp device as to each of the status of the main body and the clamping status;
　a terminal side communication unit for reading histories of the ON/OFF states of the state detection switch as to the main body status and the clamping status from the main body side memory by the wireless communication or the wired communication; and
　a display unit for obtaining and displaying messages corresponding to the read histories from a portable side memory.

* * * * *